United States Patent [19]
Hansen

[11] Patent Number: 5,791,474
[45] Date of Patent: *Aug. 11, 1998

[54] WALLET CARD PACKAGE

[75] Inventor: Roger P. Hansen, Rockford, Mich.

[73] Assignee: Display Pack, Inc., Grand Rapids, Mich.

[*] Notice: This patent issued on a continued prosecution application filed under 37 CFR 1.53(d), and is subject to the twenty year patent term provisions of 35 U.S.C. 154(a)(2).

[21] Appl. No.: 730,133
[22] Filed: Oct. 15, 1996
[51] Int. Cl.⁶ .................. B42D 15/00; B65D 27/16
[52] U.S. Cl. .................. 206/449; 283/62; 283/65; 235/486; 206/38
[58] Field of Search .................. 235/486; 206/449, 206/450, 451, 454, 37, 38, 39; 283/62, 65

[56] References Cited

U.S. PATENT DOCUMENTS

| | | | |
|---|---|---|---|
| 3,089,459 | 5/1963 | Picard | 206/449 |
| 4,711,347 | 12/1987 | Drexler et al. | 206/449 |
| 5,038,926 | 8/1991 | Van der Toorn | 206/449 |
| 5,080,223 | 1/1992 | Mitsuyama | 206/37 |
| 5,506,395 | 4/1996 | Eppley | 206/39 |
| 5,609,253 | 3/1997 | Goade, Sr. | 206/449 |

Primary Examiner—Paul T. Sewell
Assistant Examiner—Anthony Stashick
Attorney, Agent, or Firm—Warner Norcross & Judd

[57] ABSTRACT

A wallet card package having a wallet card secured between front and rear panels by a layer of peelable adhesive. The upper portion of the wallet card is sandwiched between the front and rear panels at the bottom of the package. A layer of peelable adhesive secures the upper portion of the card to the front and/or rear panels. The lower portion of the card extends from the bottom of the package and includes a magnetic strip that is accessible without removing the card from the package. The front panel may define a window permitting viewing of the upper portion.

11 Claims, 2 Drawing Sheets

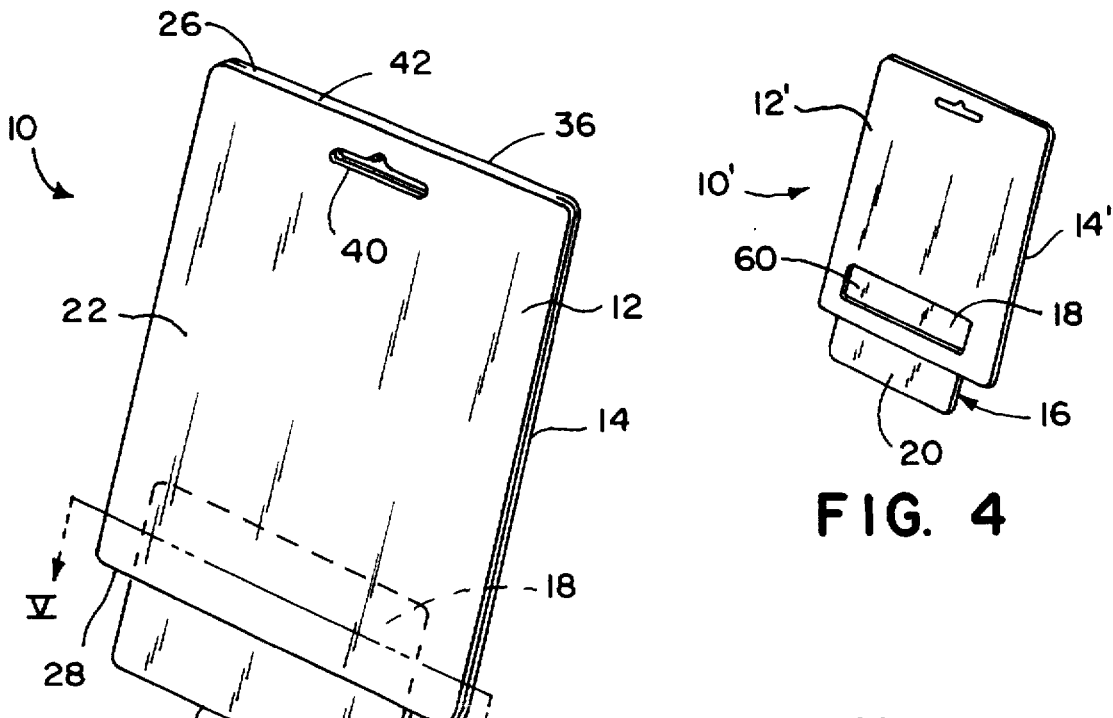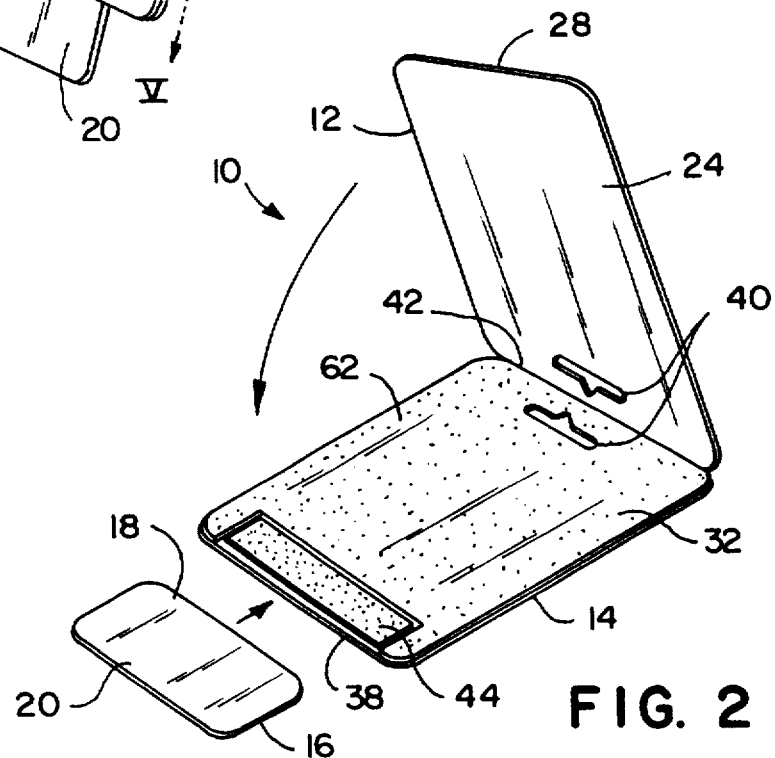

WALLET CARD PACKAGE

BACKGROUND OF THE INVENTION

The present invention relates to packaging and more particularly to a package for wallet cards such as phone cards, bank cards, credit cards, and debit cards.

Wallet cards are well known and widely used for a variety of purposes. For example, wallet cards have long been used as credit cards, debit cards, rental cards, and bank cards. Wallet cards are also used to represent pre-paid services. A prominent example of this is pre-paid phone cards which are offered by a number of leading phone service providers. These cards usually require activation before they will function. Typically, activation is performed at the time of purchase by reading the identification number stored on a magnetic strip attached to the back of the card. The identification number is read by a card reader and then transmitted to a central computer which activates the card. Once activated, the card entitles the holder to a certain number of units of telephone service.

It is desirable to package this type of card so that the magnetic strip is accessible for reading without opening the packaging. A typical phone card package includes front and rear panels that sandwich the upper portion of the card. The lower portion of the card (containing the magnetic strip) protrudes from the package so that it can be passed through a card reader without removing the card from the package. The front panel includes a transparent plastic window that covers the top of card. To prevent the card from being pulled out of the package, the card is staked to the package by a portion of the window that extends through a hole in the card. The plastic window and staking process significantly increase the cost of this package. Another phone card package includes front and rear panels that enclose the entire card. A magnetic strip containing the card's identification number is applied to the outside of the package itself, such as by silk screening. To activate the card, the package, instead of the card, is passed through a card reader at the time of purchase. The silk screening process is relatively expensive and significantly increases the cost of the package.

SUMMARY OF THE INVENTION

The aforementioned problems are overcome by the present invention wherein a wallet card package is provided with front and rear panels that close about the upper portion of the card and a layer of peelable adhesive that secures the card to the package. The lower portion of the card protrudes from the package so that it is easily passed through a card reader at the time of purchase without opening the package.

The present invention provides a simple, inexpensive wallet card package. The peelable adhesive provides sufficient shear strength to prevent the card from being pulled out of the bottom of the package. However, the card is easily peeled up from the adhesive when the package is opened.

These and other objects, advantages, and features of the invention will be readily understood and appreciated by reference to the detailed description of the preferred embodiment and the drawings.

BRIEF DESCRIPTION OF THE DRAWINGS

FIG. 1 perspective view of the wallet card package;

FIG. 2 a perspective view of the wallet card in the open position with the wallet card removed;

FIG. 4 is a perspective view of an alternative wallet card package; and

DETAILED DESCRIPTION OF THE PREFERRED EMBODIMENT

Figure 3:
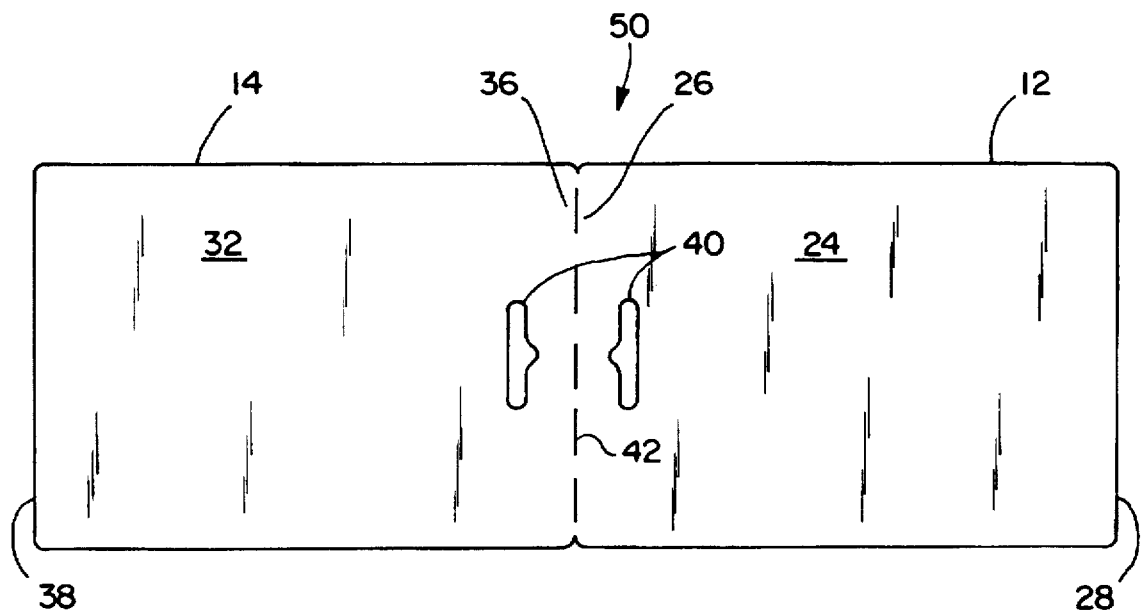
FIG. 3 is a top plan view of a blank for forming the wallet card package.

A wallet card package according to a preferred embodiment of the present invention is illustrated in FIG. 1 and generally designated 10. The package 10 includes front 12 and rear 14 panels that close about and secure the upper portion 18 of the wallet card 16. The lower portion 20 of the wallet card 16, which includes a conventional magnetic strip (not shown), extends from the bottom of the package 10 so that it is easily passed through a card reader without removing the card 16 from the package 10. Alternatively, the card 16 may include a bar code or other identification code in place of or in addition to the magnetic strip.

Figure 5:
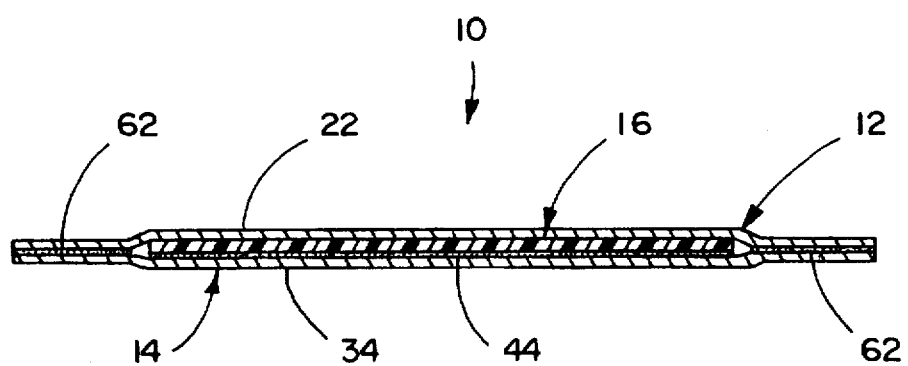
FIG. 5 is a sectional view taken along line V—V of FIG. 1.

Referring now to FIGS. 1 and 2, the front panel 12 is a generally rectangular, planar sheet of paperboard, which is inherently opaque. The front panel 12 includes a front major surface 22, a rear major surface 24, a top edge 26, and a bottom edge 28. The rear panel 14 is generally identical to the front panel 12. The rear panel 14 includes a front major surface 32, a rear major surface 34, a top edge 36, and a bottom edge 38 (See FIG. 5). As perhaps best illustrated in FIGS. 2 and 3, the front 12 and rear 14 panels are adjoined along their top edges 26 and 36, respectively, at fold line 42. Obviously, the shape of the panels can vary from application to application as desired. For example, the front and rear panels can be different in shape and/or size from each other. Also, the front and/or rear panels can include embossing in the shape of the card 16 to help locate the card in the package 10.

A layer of peelable adhesive 44 is applied to the front major surface 32 of the rear panel 14. The adhesive 44 is applied adjacent the bottom edge 38 where it will contact the upper portion 18 of the card 16 to secure the card 16 firmly to the package 10 (See FIGS. 2 and 3). The preferred adhesive is either a hot melt or a cold glue. A suitable hot melt is available from L&D Adhesives of Comstock Park, Mich. under the trade name INSTANT-LOK. Suitable cold glues include formulated rubber latex available from L&D Adhesives under the trade name National 35-6148 and compounded natural rubber latex available from P-H-X, Inc. Of Milwaukee, Wis. under the trade name PHX 4011. The peelable adhesive 44 is characterized by its relatively high shear strength and relatively low peel strength. Peelable adhesives are commonly used to hold credit cards on mailings. In this application, the high shear strength of the peelable adhesive 44 resists any attempt to pull the card 10 out of the bottom of the closed package 10, while the low peel strength permits the card 16 to be easily peeled up from the package 10 when the panels 12 and 14 are separated.

A display hole 40 is defined toward the top edge of each panel. The two holes 40 are aligned to form a single hole when the package 10 is closed. The display hole 40 is used for hanging the package 10 from a conventional display hook (not shown). Obviously, the hole 40 can be eliminated if desired.

Manufacture and Assembly

Referring now to FIG. 3, the package 10 is manufactured from a conventional die cut paperboard blank 50. The desired printed information can be applied to the blank 50 either before or after the die cutting operation. The blank 50 is cut with front 12 and rear 14 panels adjoined along fold line 42. The fold line 42 can be scored or partially cut during die cutting process to facilitate the formation of a straight consistent fold. The display holes 40 are also cut in the panels 12 and 14 during die cutting. Alternatively, the front 12 and rear 14 panels can be die cut as separate elements or they can be adjoined to each other along a different edge.

Once the package 10 is die cut, the peelable adhesive 44 is applied to the front major surface 32 of the rear panel 14 using conventional techniques and apparatus. Alternatively, the adhesive 44 can be applied to the rear major surface 24 of the front panel 12, or to both the front and rear panels. The card 16 is then secured to the package 10 by placing it into position on the front 12 or rear 14 panel with its upper portion 18 extending over the adhesive 44 and its lower portion 20 extending beyond the bottom edge 38 of the rear panel 14.

A layer of adhesive or cement 62 is then applied to either or both of the front and rear panels using conventional techniques and apparatus. The die cut 50 is then folded along fold line 42 using conventional folding machinery. The front panel 12 folds down over the rear panel 14 and card 16 to complete the package 10. The cement 62 secures the panels 12 and 14 in the folded position.

In use, the cemented front 12 and rear 14 panels firmly press and hold the card 16 and peelable adhesive 44 together. The peelable adhesive 44 includes a high shear strength that prevents the card from being pulled out of the bottom of the package 10 while the front 12 and rear 14 panels are together. To remove the card 16, the two panels 12 and 14 are separated from each other providing full access to one side of the card 16. The card 16 is then peeled up from the peelable adhesive 44 to separate it from the package 10. The low peel strength of the peelable adhesive 44 permits easy removal of the card 16.

Alternatively, the cement 62 can be eliminated and the front 12 and rear 14 panels can be sealed together using an alternative technique. For example, the two panels can be intersecured by a heat activated adhesive that is pre-applied to the blank 50. When a heat activated adhesive is used, the two panels are folded and then sealed together by selectively applying heat and pressure to the panels. As a second example, the front 12 and rear 14 panels can be intersecured by applying a layer of peelable adhesive to the entire face of either or both of the front 12 and rear 14 panels. In this embodiment, the layer of peelable adhesive secures the panels together and holds the card in place between the panels.

Alternative Embodiment

In the alternative embodiment illustrated in FIG. 4, package 10' is provided with a window 60 to permit viewing of information and graphics printed on the upper portion 18 of the card 16. The window 60 is defined by the front panel 12' and is formed during the die cutting process. Alternatively or in combination, the window 60 can be defined by the rear panel 14' to permit viewing of information and graphics printed on the rear of the card 16. Optionally, a layer of transparent plastic material (not shown) can be secured within the window 60 to protect the card 16 from damage and/or hold the card in place.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A wallet card package for packaging a wallet card during sale of the wallet card to customers comprising:

an opaque front panel;

an opaque rear panel, said rear panel attached to said front panel;

a wallet card having a first portion, a second portion, and a magnetic strip along said second portion, said first portion disposed between said front panel and said rear panel, said second portion protruding from between said panels, whereby said magnetic strip is accessible without opening the package or removing said card from the package; and an adhesive disposed between said first portion of said card and at least one of said front panel and said rear panel, said adhesive having a high shear strength and a low peel strength, whereby said adhesive resists separation of said card from the package when said panels are closed about said card while permitting easy peeling of said card from said package when said panels are separated.

2. The package of claim 1 wherein said front panel and said rear panel each include a bottom edge, said card protruding from between said panels.

3. The package of claim 2 wherein said front panel and said rear panel each include a top edge, said front panel and said rear panel integrally connected at said top edges along a fold line.

4. The package of claim 3 wherein at least one of said front panel and said rear panel defines a window adjacent said upper portion of said card, said window permitting viewing of said upper portion of said card.

5. A wallet card package for packaging a wallet card during sale of the wallet card to customers comprising:

an opaque front panel having a surface area, a rear major surface, a top edge, a side edge, and a bottom edge;

an opaque rear panel having a surface area, a front major surface, a top edge, a side edge, and a bottom edge; and a wallet card having a surface area, an upper portion, a bottom portion, and a magnetic strip along said bottom portion, said upper portion disposed between said rear major surface of said front panel and said front major surface of said rear panel, said bottom portion protruding beyond said bottom edges, whereby said magnetic strip is accessible without opening the package or removing said card from the package, said surface area of at least one of said front panel and said rear panel being at least twice as great as said surface area of said card whereby said one of said panels extends beyond an edge of said wallet card; and a peelable adhesive disposed between said upper portion of said card and at least one of said rear major surface of said front panel and said front major surface of said rear panel, whereby said peelable adhesive resists separation of said card from the package when said panels are closed about said card.

6. The package of claim 5 wherein at least one of said front panel and said rear panel defines a window adjacent said upper portion of said card, said window permitting viewing of said upper portion of said card.

7. A wallet card package for packaging a wallet card during sale of the wallet card to customers comprising:

adjacent, opaque front and rear panels interconnected along a fold line;

a wallet card having an upper portion disposed between said front and rear panels and a lower portion extending from between said panels, said lower portion including identification means for uniquely identifying said card; and a layer of peelable adhesive disposed between said upper portion of said card and at least one of said front panel and said rear panel, said peelable adhesive resisting separation of said card from the package.

8. The package of claim 7 wherein at least one of said front panel and said rear panel defines a window adjacent said upper portion of said card, said window permitting viewing of said upper portion of said card.

9. The package of claim 1 wherein at least one of said front panel and said rear panel extends substantially beyond an edge of said wallet card to provide a surface for displaying printed material regarding said wallet card.

10. The package of claim 1 wherein at least one of said front panel and said rear panel extends substantially beyond an edge of said wallet card and provides a means for suspending said package from a display hook.

11. The package of claim 1 wherein at least one of said front panel and said rear panels provides a means for suspending said package from a display hook.

* * * * *